(12) United States Patent
Bergmeier et al.

(10) Patent No.: US 9,192,095 B1
(45) Date of Patent: Nov. 24, 2015

(54) TUBELESS FERTILIZER KNIFE

(71) Applicant: Shield Industries, Inc., Hutchinson, KS (US)

(72) Inventors: Mike J Bergmeier, Hutchinson, KS (US); Logan Deane Hurlbut, Hutchinson, KS (US)

(73) Assignee: ShieldIndustries, Inc., Hutchinson, KS (US)

( * ) Notice: Subject to any disclaimer, the term of this patent is extended or adjusted under 35 U.S.C. 154(b) by 147 days.

(21) Appl. No.: 13/801,106

(22) Filed: Mar. 13, 2013

Related U.S. Application Data

(60) Provisional application No. 61/697,987, filed on Sep. 7, 2012.

(51) Int. Cl.
| | |
|---|---|
| *A01C 5/06* | (2006.01) |
| *A01C 7/00* | (2006.01) |
| *A01C 15/00* | (2006.01) |
| *A01C 21/00* | (2006.01) |
| *A01C 23/02* | (2006.01) |
| *A01B 79/02* | (2006.01) |
| *A01B 23/02* | (2006.01) |
| *A01B 35/20* | (2006.01) |
| *A01B 49/06* | (2006.01) |

(52) U.S. Cl.
CPC ............. *A01C 23/025* (2013.01); *A01B 23/02* (2013.01); *A01B 35/20* (2013.01); *A01B 49/06* (2013.01); *A01B 79/02* (2013.01); *A01C 5/062* (2013.01); *A01C 15/00* (2013.01); *A01C 15/008* (2013.01); *A01C 21/00* (2013.01)

(58) Field of Classification Search
CPC ............ A01C 5/00; A01C 5/06; A01C 5/062; A01C 7/00; A01C 7/004; A01C 7/006; A01C 7/04; A01C 7/06; A01C 7/08; A01C 7/082; A01C 7/20; A01C 7/206; A01C 15/00; A01C 15/008; A01C 15/005; A01C 21/00; A01C 21/002; A01C 23/00; A01C 23/006; A01C 23/023; A01C 23/024; A01C 23/025; A01C 23/04; A01B 79/02; A01B 79/005; A01B 79/00; A01B 35/00; A01B 23/02; A01B 23/00; A01B 35/20; A01B 49/06; A01B 49/04; A01B 49/00
See application file for complete search history.

(56) References Cited

U.S. PATENT DOCUMENTS

| | | |
|---|---|---|
| 2,148,925 A | 2/1939 | Bochy |
| 2,598,121 A | 5/1952 | Hannibal |
| 2,619,054 A | 11/1952 | Bell |
| 2,684,617 A | 7/1954 | Johnston |
| 2,689,514 A | 9/1954 | Ferguson |

(Continued)

FOREIGN PATENT DOCUMENTS

| | | |
|---|---|---|
| AU | 217205 | 3/1957 |
| CA | 496012 | 9/1953 |

(Continued)

*Primary Examiner* — Christopher J Novosad

(57) ABSTRACT

An improved fertilizer knife presents a leading edge and rear tube receiving portion. The rear tube receiving portion is precision cast to frictionally receive the distal end of a flexible polymer fertilizer tube which is connected, at least indirectly, to an implement fertilizer tank. The rear tube receiving portion also has at least one opening at the lower end thereof for allowing fertilizer to escape from the flexible polymer fertilizer tube into the surrounding soil during a fertilizing operation.

5 Claims, 6 Drawing Sheets

(56) References Cited

U.S. PATENT DOCUMENTS

| | | |
|---|---|---|
| 2,716,823 A | 9/1955 | Mullin |
| 2,734,439 A | 2/1956 | Padrick |
| 2,768,591 A | 10/1956 | James |
| 2,842,077 A | 7/1958 | Morrison |
| 2,849,969 A | 9/1958 | Taylor |
| 2,874,656 A | 2/1959 | Bennett |
| 2,904,119 A | 9/1959 | Hunter |
| 2,924,187 A | 2/1960 | Zimmerman |
| 3,002,574 A | 10/1961 | Padrick |
| 3,092,052 A | 6/1963 | Anderson |
| 3,177,830 A | 4/1965 | Zimmerman |
| 3,188,988 A | 6/1965 | Peck |
| 3,259,087 A | 7/1966 | Horton |
| 3,289,772 A | 12/1966 | Blackwood |
| 3,296,985 A | 1/1967 | Shelton |
| 3,517,752 A | 6/1970 | Glee |
| 3,618,538 A | 11/1971 | Brannan |
| 3,919,951 A | 11/1975 | Williams |
| 3,970,445 A | 7/1976 | Gale et al. |
| 4,033,271 A | 7/1977 | Williams et al. |
| 4,132,181 A | 1/1979 | Smith |
| 4,201,142 A | 5/1980 | Stump |
| 4,269,274 A | 5/1981 | Robertson et al. |
| 4,333,536 A | 6/1982 | Ryan |
| 4,355,589 A | 10/1982 | Wetmore |
| 4,446,927 A | 5/1984 | Robertson |
| 4,592,294 A | 6/1986 | Dietrich et al. |
| 4,616,580 A | 10/1986 | Moore et al. |
| 4,628,839 A | 12/1986 | Edmisson |
| 4,638,748 A | 1/1987 | Kopecky |
| 4,719,862 A | 1/1988 | Edmisson |
| 4,773,340 A | 9/1988 | Williams et al. |
| 4,834,189 A | 5/1989 | Peterson et al. |
| 4,869,328 A | 9/1989 | Carroll |
| 4,893,434 A * | 1/1990 | Knipp et al. .................. 43/124 |
| 5,310,009 A | 5/1994 | Rowlett |
| 5,314,029 A | 5/1994 | Rowlett |
| 5,452,673 A | 9/1995 | Bruce |
| 5,787,994 A | 8/1998 | Friesen |
| 6,167,821 B1 | 1/2001 | Beggs |
| 6,318,279 B1 | 11/2001 | Rowlett et al. |
| 6,382,114 B1 | 5/2002 | Lanpher |
| 6,397,767 B1 | 6/2002 | Dietrich, Sr. |
| 6,405,665 B1 | 6/2002 | Henry et al. |
| 6,745,709 B2 | 6/2004 | Rowlett et al. |
| 6,871,709 B2 | 3/2005 | Knobloch et al. |
| 6,955,131 B2 | 10/2005 | Beaujot et al. |
| 6,973,884 B2 | 12/2005 | Dietrich, Sr. |
| 7,568,439 B2 | 8/2009 | Steinlage et al. |
| 8,161,894 B1 | 4/2012 | Albright et al. |

FOREIGN PATENT DOCUMENTS

| | | |
|---|---|---|
| CA | 945183 | 4/1974 |
| DE | 552793 | 11/1930 |
| DE | 35151 | 1/1965 |
| FR | 657738 | 5/1929 |
| FR | 904577 | 11/1945 |
| GB | 677874 | 8/1952 |
| GB | 1141320 | 1/1969 |
| NL | 7409495 | 7/1974 |

\* cited by examiner

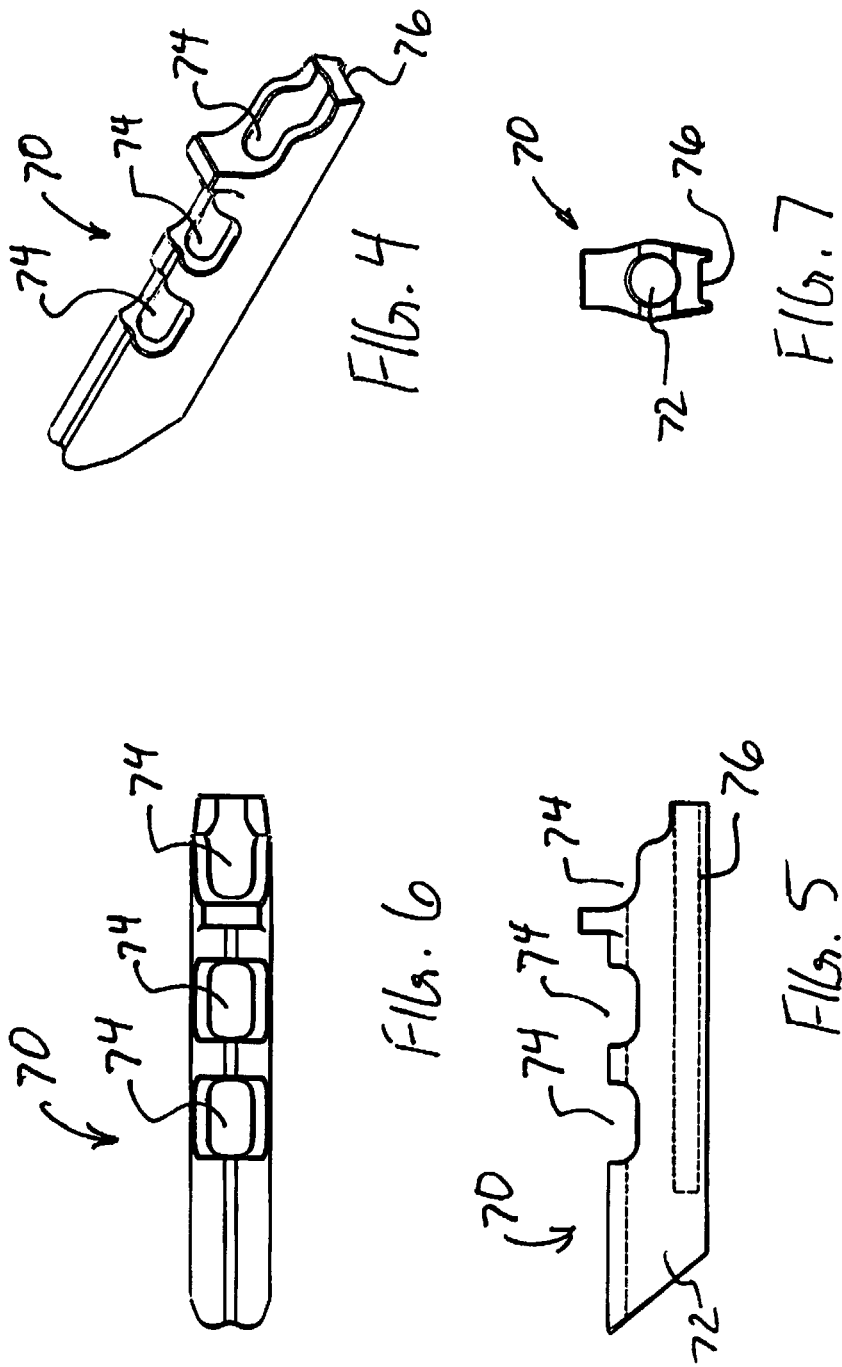

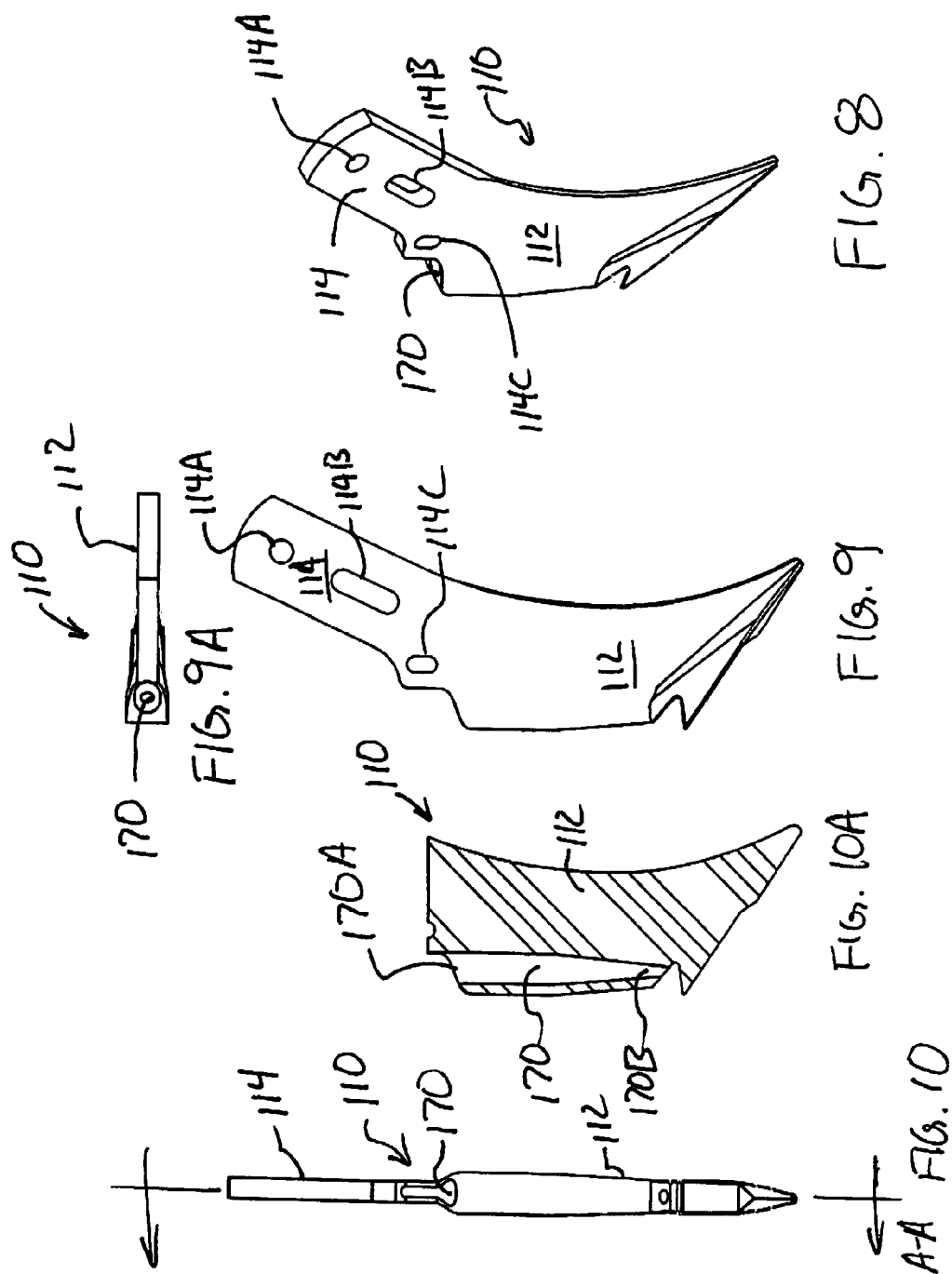

TUBELESS FERTILIZER KNIFE

CROSS REFERENCES TO RELATED APPLICATIONS

This application claims the benefit of U.S. provisional application Ser. No. 61/697,987 filed on Sep. 7, 2012 which is incorporated herein by reference.

FIELD OF THE INVENTION

This invention relates to an improved fertilizer applicator knife that is operable for receiving a flexible fertilizer tube attached to a fertilizer implement.

BACKGROUND OF THE INVENTION

Fertilizer knives are employed by farmers to deliver nitrogen enriching fertilizers such as anhydrous ammonia or liquid fertilizers to a targeted zone beneath the surface of the soil of a crop field while minimizing disruption to the structure of the upper layer of the topsoil. Typically, a fertilizer implement carries a pattern of fertilizer knives spaced for simultaneously delivering fertilizer to a plurality of parallel furrows.

Typical prior art fertilizer knives are cast as one piece or are more commonly a combination of a tough steel knife blank and cast iron knife point that is welded to the knife blank. The cast iron knife point has a wedge-shaped leading edge for cutting through soil. With a typical prior art fertilizer knife, a steel fertilizer tube is welded to the trailing edge of the knife blank. For most fertilizer knives, the steel fertilizer tube is welded to the back surface of the knife blank and the fertilizer tube terminates at the base of the knife. Because the fertilizer knife is usually fashioned from a combination of steel and cast iron, the fertilizer tube is fashioned from steel so it can be welded to the trailing portion of the fertilizer knife. The use of a steel fertilizer knife tube presents two disadvantages. First, the skilled reader may recall that the knife shank is bolted to an implement shank with two bolts—an upper bolt and a lower bolt. The lower bolt is designed to function as a structural fuse. If the fertilizer knife encounters an obstacle during use, the lower bolt fails and allows the fertilizer knife to swing back without damaging the fertilizer implement. However, when the lower attachment bolt fails, and, as the fertilizer knife swings back, the steel fertilizer knife tube is often damaged beyond repair. While this action has protected the implement from damage, a damaged fertilizer knife tube makes it necessary to replace the knife. Although an operator will often have spare shank bolts on hand, an operator will usually not have a replacement fertilizer knife available. Accordingly, the damaged fertilizer tube often causes a delay in operations. Second, in the case of anhydrous ammonia, NH3, which boils at approximately −30° F., it is highly advantageous to deliver NH3 to the soil in liquid form. This is because the liquid NH3 absorbs large amounts of heat when it boils. Further, vaporization of NH3 in the highly thermally conductive steel fertilizer knife tube causes great amounts of heat to be transferred into the fertilizer knife tube from the steel and cast iron knife. This is because the heat of vaporization of liquid NH3 is far greater than its specific heat. In relatively cool soil conditions, this can cause ice to accumulate at the lower end of the fertilizer knife which greatly reduces the utility and function of the fertilizer knife. What is needed is a fertilizer knife that eliminates the above noted disadvantages inherent in a fertilizer knife having a steel fertilizer tube.

BRIEF DESCRIPTION OF THE INVENTION

The above described needs are addressed by an improved fertilizer knife having a knife point that presents a leading edge and rear tube receiving portion. The rear tube receiving portion is precision cast to frictionally receive the distal end of the flexible polymer fertilizer tube that is connected, at least indirectly, to an implement fertilizer tank. The rear tube receiving portion also has at least one opening at its lower end for allowing fertilizer to escape from the flexible polymer tube into the surrounding soil during a fertilizing operation.

BRIEF DESCRIPTION OF THE DRAWINGS

FIG. 4 is a perspective view of a tube receiving portion of a tubeless fertilizer knife.

FIG. 5 is a side view of the tube receiving portion of a tubeless fertilizer knife.

FIG. 6 is a top view of the tube receiving portion of a tubeless fertilizer knife.

FIG. 7 is an end view of the tube receiving portion of a tubeless fertilizer knife.

FIG. 8 is a perspective view of a second embodiment of a tubeless fertilizer knife.

FIG. 9 is a side view of the second embodiment of the tubeless fertilizer knife.

FIG. 9A is a top view of the second embodiment of the tubeless fertilizer knife.

FIG. 10 is a front view of the second embodiment of the tubeless fertilizer knife.

FIG. 10A is a partial cross-section side view of the second embodiment of the tubeless fertilizer knife taken from plane A-A of FIG. 10.

DETAILED DESCRIPTION

Figure 1:
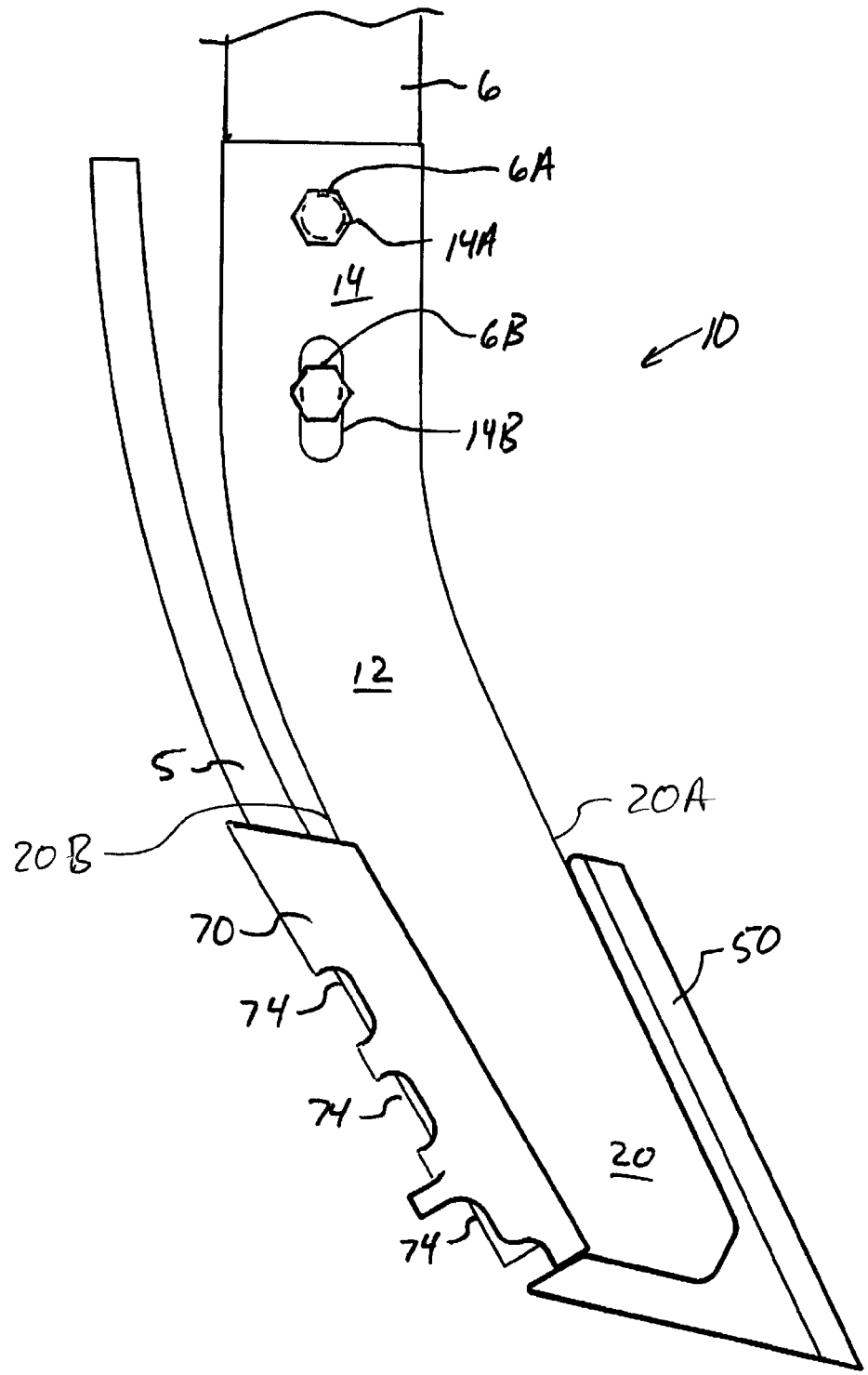
FIG. 1 is a side view of the tubeless fertilizer knife with a flexible fertilizer tube shown in phantom.

Referring to the drawings, FIG. 1 shows a first embodiment for an improved fertilizer knife 10. Fertilizer knife 10 is suitable for bolting with bolts 6A and 6B to a fertilizer implement shank 6. The skilled reader should refer to U.S. Pat. Nos. 8,161,894 and 7,568,439, which are incorporated herein by reference for background concerning the general arrangement for securing a fertilizer knife to a fertilizer implement and the general configuration and use of such a fertilizer knife. As can be seen in FIG. 1, the fertilizer knife 10 includes a knife blank 12, a point portion 50 and a tube receiving portion 70. Knife blank 12 includes an upper portion 14 suitable for mounting to an implement shank as shown in FIG. 1 and a lower portion 20. Lower portion 20 includes a leading edge 20A and a trailing edge 20B. Point portion 50 is welded to leading edge 20A. Tube receiving portion 70 is welded to trailing edge 20B. As can be best seen in FIG. 3, upper portion 14 has an upper bolt hole 14A and a lower bolt slot 14B. Upper bolt hole 14A and lower bolt slot 14B are arranged generally vertically on upper portion 14. An elongated slot is used for lower bolt slot 14B to accommodate any varying bolt positions that might occur for various fertilizer implements. Bolts 6A and 6B are used to attach knife 10 to an implement shank 6 as shown in FIG. 1. As noted above, lower bolt 6B is designed to shear off when knife 10 encounters an obstacle prior to any significant damage being inflicted on the fertilizer implement.

Typically, knife blank 12 is fashioned from tough steel capable of transferring bending loads, while point portion 50 and tube receiving portion 70 are typically fashioned from hard, but brittle cast iron suitable for withstanding the abrasion that occurs when fertilizer knife 10 is drafted through soil.

Figure 2:
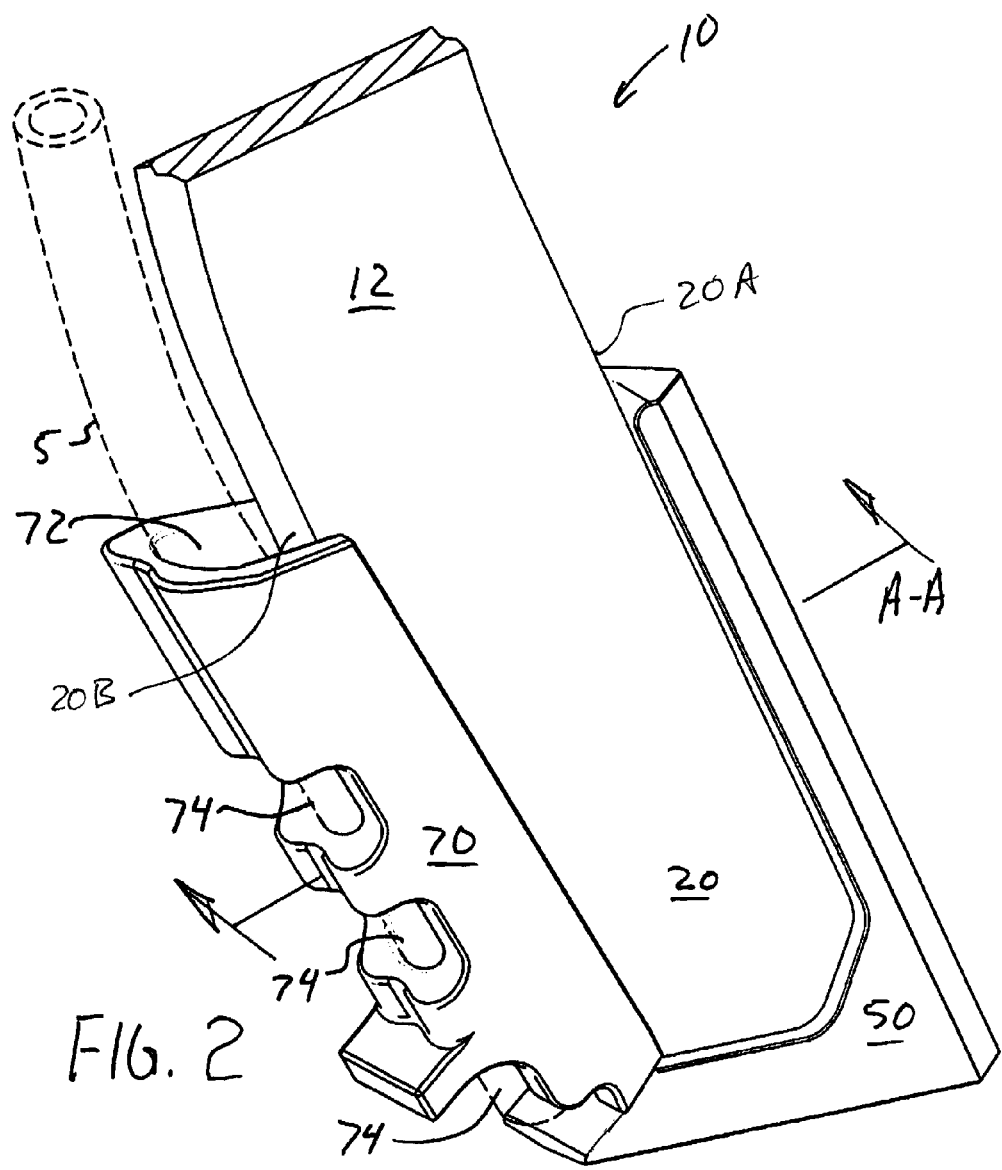
FIG. 2 is a perspective view of the fertilizer knife of FIG. 1 with a flexible fertilizer tube shown in phantom.
Figure 3:
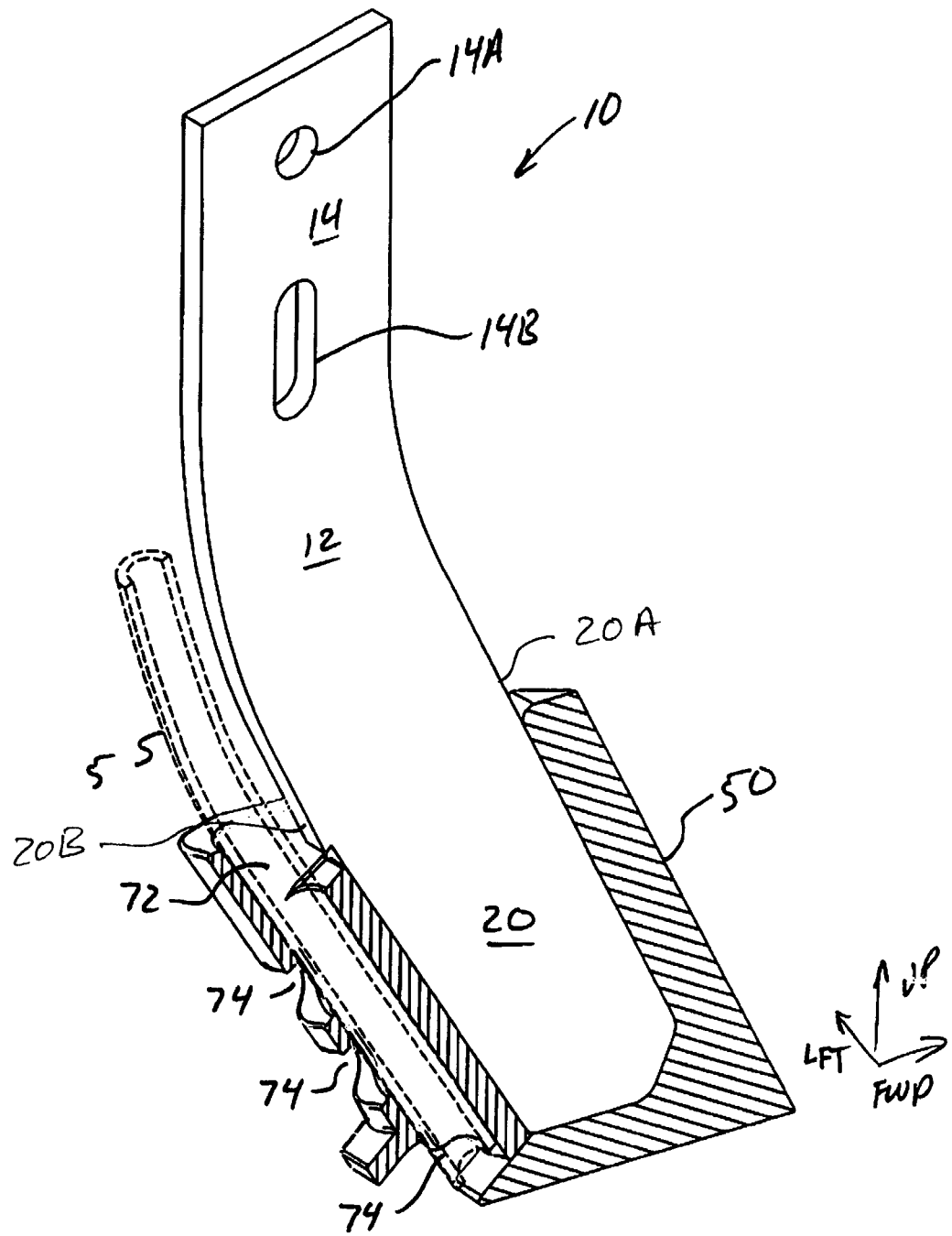
FIG. 3 is a cross-section perspective view of the fertilizer knife of FIG. 2 taken from plane A-A of FIG. 2.

As can be seen in FIG. 1, point portion 50 is welded to the lower end of knife blank 12 and generally has a configuration well known to those skilled in the art, with the exception that point portion 50 must be designed so it does not interfere with tube receiving portion 70. Tube receiving portion 70 is welded to trailing edge 20B of the lower end of knife blank 12 as shown in FIGS. 1 and 2. Tube receiving portion 70 is a precision cast iron part. A tube channel 72 extends from the upper end of tube receiving portion 70 to at least one opening 74 at the lower end of tube receiving portion 70. Tube receiving portion 70 is oriented so that tube channel 72 is partially upright and angled forward as shown in FIG. 2. In this example, tube channel 72 is preferably tubular and has internal dimensions that are adapted for frictionally receiving a standard, flexible polymer anhydrous ammonia fertilizer implement tube 5 as shown in FIG. 3. In this example, tube 5 is fashioned from ethylene-vinyl acetate (EVA) as is well known to those skilled in the art. Although channel 72 is cylindrical in this example, it does not have to be cylindrical. Those skilled in the art know that EVA fertilizer tubes are flexible, and for most applications, have a standard outside diameter, which in this example is 0.59 inch. Thus, in this example, the inside diameter of the channel 72 is generally 0.61 inch. Preferably the diameter of channel 72 should be held within a narrow tolerance and should not fall below the diameter of tube 5. It is important that it is always possible (or at least with only very rare exceptions) for an operator to insert tube 5 into channel 72. Those skilled in the art also know that ethylene-vinyl acetate is a polymer that is a thermal insulator (especially when compared to steel). For reasons noted above, this is a useful property for a tube for conveying liquid NH3 to a release point.

In this example embodiment, flexible EVA fertilizer tube 5 is received by channel 72 of tube receiving portion 70. Tube 5 terminates at the lower end of channel 72. A series of openings 74 are defined in the rear wall of tube receiving portion 70 which communicate with the lower end of channel 72. Openings 74 are intended to accommodate various configurations that might be used with tube 5 where various openings may be defined in tube 5. A single opening 74 at the bottom end of channel 72 may be sufficient for many applications.

The skilled reader will appreciate from the above description that with this first embodiment fertilizer knife 10, NH3 is conveyed to a release point at the lower end of channel 72 of tube receiving portion 70 through EVA fertilizer tube 5 which has a relatively low thermal conductivity and not through a thermally conductive steel tube as is the case with prior art fertilizer knives. Thus, liquid NH3 is more likely to be released from the lower end of the knife as a liquid and is less likely to boil and absorb great amounts of heat as it reaches the release point. The skilled reader will also appreciate that since tube 5 (shown in FIG. 3) is flexible, a failure of a lower attachment bolt 6B (shown in FIG. 1) will result in no damage to any tube that is needed to convey fertilizer to the release point. Merely replacing the sheared lower bolt 6B is all that would be needed to bring fertilizer knife 10 back into operation.

Figure 11:
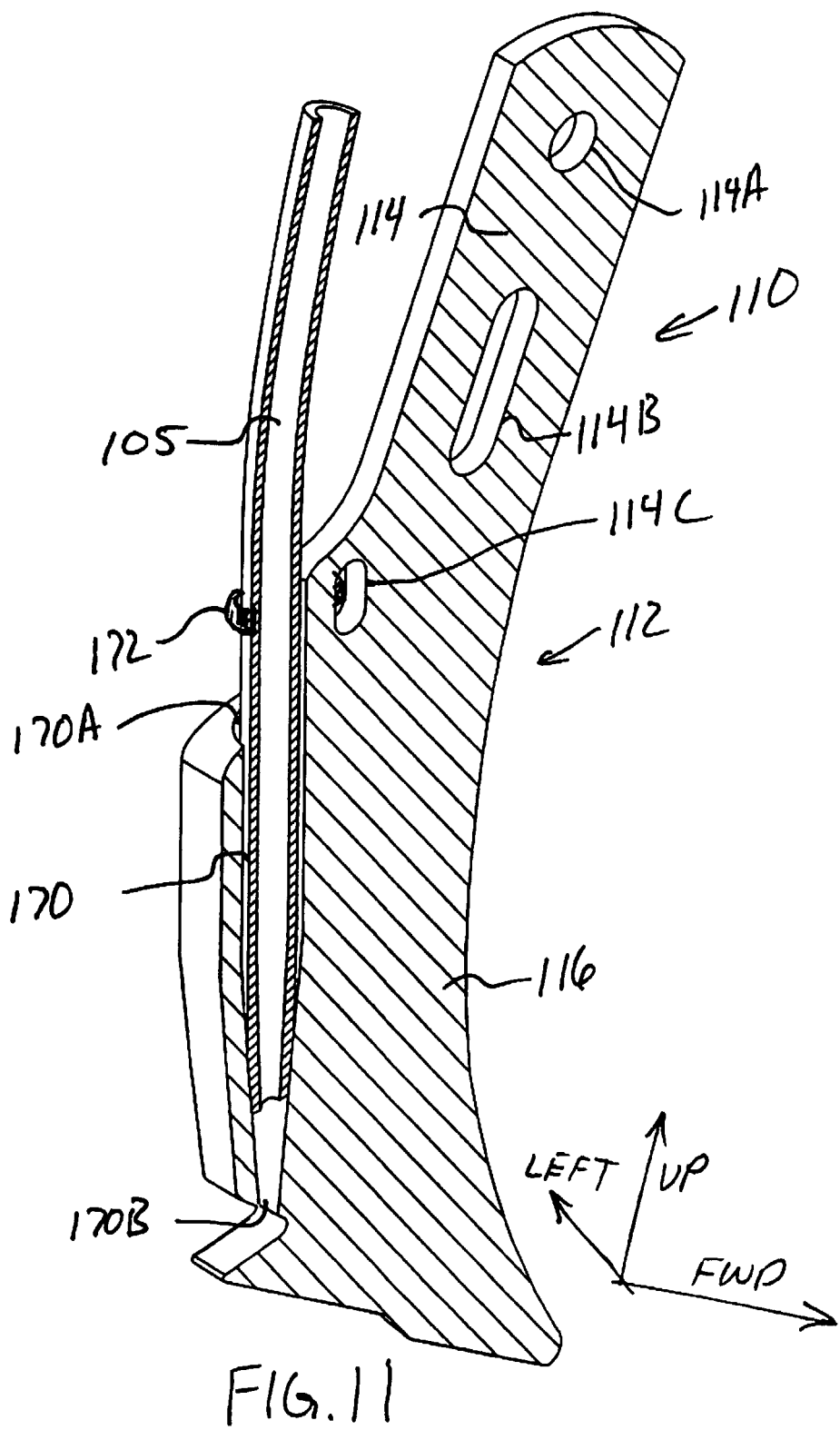
FIG. 11 is a perspective cross-section view of the second embodiment of the tubeless fertilizer knife taken from plane A-A of FIG. 10.

Referring to the drawings, FIG. 8 shows a second embodiment for an improved fertilizer knife 110 which is suitable for bolting to a fertilizer implement shank (not shown) as described above. As can be seen in FIG. 11, fertilizer knife 110 includes knife body 112 which has an upper attachment portion 114 and a lower blade portion 116. As with knife blank 12 described above, upper portion 114 of knife body 112 has an upper bolt hole 114A and a lower bolt slot 114B. Upper and lower bolt hole 114A and lower bolt slot 114B are also arranged generally vertically on upper portion 114. As described above, an elongated slot is used for lower bolt slot 114B to accommodate any varying bolt positions that might occur for various fertilizer implements. As can be seen in FIG. 11, a generally upright but forwardly angled tube channel 170 is defined for receiving a flexible fertilizer tube 105 (shown in phantom in FIG. 11). Tube channel 170 slopes mostly down and partially forward as shown in FIG. 11. Knife 110 is preferably a precision cast iron part.

Tube channel 170 extends between an upper opening 170A and a lower opening 170B. In this example, tube channel 170 has a specific shape which is adapted to receive a typical rubber tube used for delivering liquid fertilizer. As can be seen by inspecting FIGS. 9 and 9A, in this example, tube channel 170 has an oval shape that is approximately 15% to 25% wider in the longitudinal direction than in the transverse direction. In this example, tube channel 170 at its upper end is approximately 19% wider in the longitudinal direction than in the transverse direction. Further, as can be best seen by referring to FIG. 10A, channel 170 tapers between a location that is generally halfway between its upper opening and its lower opening and lower opening 170B so that channel 170 is substantially narrower at lower opening 170B.

As can be best understood by consulting FIG. 11, a flexible fertilizer tube 105 is inserted as far as possible into channel 170. Preferably, a zip tie 172 (shown as if cut away in FIG. 11) or a standard hose clamp (not shown) is secured by using a clamp opening 114C in order to firmly clamp fertilizer tube 105 to the back surface of lower portion 116 of knife body 112. With this type of fertilizer knife, a liquid fertilizer, which includes various fertilizing components dissolved in water, is delivered through tube 105. The boiling of a liquid fertilizer and the resulting accumulation of ice is not a concern in this case for second embodiment fertilizer knife 110. However, as noted above, the welded steel fertilizer tube has been eliminated from the fertilizer knife so that should knife 110 pivot back as a result of encountering an obstacle, flexible tube 105 is very unlikely to break or be damaged. Thus, by using second embodiment fertilizer knife 110, an operator can resume operations should the lower attach bolt fail by merely pivoting knife 110 back into position and replacing the sheared lower bolt.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A fertilizer knife, comprising:
(a) a knife blank having an upper portion and a lower portion, the upper portion having bolt holes for receiving bolts common to the bolt holes of a shank of a multi-point fertilizer implement, the lower portion of the knife blank having a leading edge and a trailing edge, (b) a knife point welded to the leading edge of the lower portion of the knife blank, the knife point having a leading edge portion for braking and cutting through soil, and, (c) a tube receiving portion fixed to the trailing edge of the lower portion of the knife blank, the tube receiving portion having a tube channel operable to securely receive a flexible polymer fertilizer tube, the tube receiving portion fashioned to register with the flexible polymer fertilizer tube such that the flexible polymer fertilizer tube is able to be frictionally inserted into the tube receiving portion such that the flexible polymer fertilizer tube is retained in the tube receiving portion, the tube receiving portion presenting at least one opening at a lower end thereof to allow liquid fertilizer to escape from the flexible polymer fertilizer tube.

2. The fertilizer knife of claim 1, wherein:
the fertilizer knife is a one-piece cast part.

3. The fertilizer knife of claim 1, wherein:
the fertilizer knife is a one-piece cast part, and,
the tube channel is oval shaped.

4. The fertilizer knife of claim 1, wherein:
the fertilizer knife is a one-piece cast part,
the tube channel has an upper portion that is oval-shaped, and,
the tube channel has a lower portion that tapers to a smaller diameter.

5. A fertilizer knife, comprising:

(a) a knife blank having an upper portion and a lower portion, the upper portion having bolt holes for receiving bolts common to the bolt holes of a shank of a multi-point fertilizer implement, the lower portion of the knife blank having a leading edge and a trailing edge, (b) a knife point portion welded to the leading edge of the lower portion of the knife blank, the knife point portion having a leading edge portion for breaking and cutting through soil, (c) a tube receiving portion welded to the trailing edge of the lower portion of the knife blank, the tube receiving portion having a tube channel operable to securely receive a flexible polymer fertilizer tube of a multi-point fertilizer implement, the tube receiving portion fashioned to register with the flexible polymer fertilizer tube in order to retain the flexible polymer fertilizer tube when the fertilizer knife is in operation, the tube receiving portion presenting at least one opening at a lower end thereof to allow liquid fertilizer to escape from the flexible polymer fertilizer tube.

\* \* \* \* \*